United States Patent
Salomäki et al.

(10) Patent No.: US 7,560,894 B2
(45) Date of Patent: Jul. 14, 2009

(54) METHOD AND SYSTEM IN CONNECTION WITH PERMANENT MAGNET SYNCHRONOUS MACHINES

(75) Inventors: Janne Salomäki, Hyvinkää (FI); Antti Piippo, Espoo (FI)

(73) Assignee: ABB Oy, Helsinki (FI)

( * ) Notice: Subject to any disclaimer, the term of this patent is extended or adjusted under 35 U.S.C. 154(b) by 211 days.

(21) Appl. No.: 11/812,074

(22) Filed: Jun. 14, 2007

(65) Prior Publication Data
US 2008/0030162 A1 Feb. 7, 2008

(30) Foreign Application Priority Data
Jun. 15, 2006 (EP) ................... 06115523

(51) Int. Cl.
*H02P 6/00* (2006.01)
(52) U.S. Cl. .............. 318/721; 318/701; 318/727; 318/807
(58) Field of Classification Search ......... 318/701, 318/721, 727, 800, 807
See application file for complete search history.

(56) References Cited

U.S. PATENT DOCUMENTS

| | | | | |
|---|---|---|---|---|
| 5,418,440 | A * | 5/1995 | Sakaguchi et al. | 318/560 |
| 6,825,637 | B2 * | 11/2004 | Kinpara et al. | 318/700 |
| 6,922,681 | B2 * | 7/2005 | Fromherz et al. | 706/23 |
| 6,933,701 | B2 * | 8/2005 | Kinpara et al. | 318/700 |
| 7,098,623 | B2 * | 8/2006 | Piippo | 318/721 |
| 7,221,152 | B2 | 5/2007 | Piippo | |
| 2005/0001583 | A1 * | 1/2005 | Hinkkanen | 318/807 |
| 2005/0052117 | A1 | 3/2005 | Ozaki et al. | |
| 2006/0000918 | A1 | 1/2006 | Kano et al. | |
| 2006/0091847 | A1 * | 5/2006 | Piippo | 318/721 |

FOREIGN PATENT DOCUMENTS

EP 1 513 250 A2 3/2005

(Continued)

OTHER PUBLICATIONS

Y.Murai et al., "Leakage Current Reduction For A High-Frequency Carrier Inverter Feeding An Induction Motor", IEEE Trans. Ind. Applicat., vol. 28, No. 4, pp. 858-863, Jul./Aug. 1992.

(Continued)

*Primary Examiner*—Paul Ip
(74) *Attorney, Agent, or Firm*—Buchanan Ingersoll & Rooney PC

(57) ABSTRACT

A method and a system in connection with a speed and position sensorless permanent magnet synchronous machine equipped with an output filter and driven by an inverter, which method comprises the steps of forming a speed-adaptive full-order observer based on the dynamic model of the combination of the permanent magnet synchronous machine (PMSM) and the output filter, measuring the inverter output current ($i_A$), estimating inverter output current ($\hat{i}_A$), determining the estimate for the electrical angular speed ($\omega_m$) using the estimated and measured inverter output currents ($\hat{i}_A$, $i_A$) in an adaptation law, injecting a voltage signal ($u_c$) into the inverter voltage reference ($u_{A,ref0}$) to obtain a modified voltage reference ($u_{A,ref}$), detecting an error signal ($\epsilon$) from the measured inverter output current ($i_A$), and calculating the speed correction term ($\omega_\epsilon$) used in the adaptation of the observer from the error signal ($\epsilon$).

12 Claims, 2 Drawing Sheets

FOREIGN PATENT DOCUMENTS

| | | |
|---|---|---|
| EP | 1 653 601 A1 | 5/2006 |
| WO | 2004/114510 A2 | 12/2004 |
| WO | 2006/060329 A2 | 6/2006 |

OTHER PUBLICATIONS

M.Carpita et al., "Power Converted Filtering Techniques Design For Very High Speed Drive Systems", in Proc. EPE'01, Graz, Austria, pp. 1-10, Aug. 2001.

T.D.Batzel et al., "Electric Propulsion With Sensorless Permanent Magnet Synchronous Motor: Implementation and Performance", IEEE Trans. Energy Conversion, vol. 20, No. 3, pp. 575-583, Sep. 2005.

J.-D.Park et al., "Design and Control of High-Speed Solid-Rotor Synchronous Reluctance Drive With Three-Phase LC Filter", in Conf. Rec. IEEE-IAS Annu. Meeting, Hong Kong, China, pp. 715-722, Oct. 2005.

R.Seliga et al., "Multiloop Feedback Control Strategy in Sinewave Voltage Inverter For An Adjustable Speed Cage Induction Motor Drive System", in Proc.EPE'01, raz, Austria, pp. 1-9, Aug. 2001.

M.Kojima et al., "Novel Vector With OutputLC Filter", IEEE Trans. Ind. Applicat., vol. 40, No. 1, pp. 162-169, Jan./Feb. 2004.

J.Salomäki et al., "Sensorless Vector Control of an Induction Motor Fed By a PWM Inverter Through An Outlet LC Filter", Trans. IEEJ, vol. 126-D, No. 4, pp. 430-437, Apr. 2006.

J.Salomäki et al., Sensorless Control of Induction Motor Drives With Inverter Output Filter, in Proc. IEEE IEMDC'05, San Antonio, TX, pp. 332-339, May 2005.

M.Corley et al., "Rotor Position and Velocity Estimation For A Salient-Pole Permanent Magnet Synchronous Machine at Standstill and High Speeds", IEEE Trans. Ind. Applicat., vol. 43, No. 4, pp. 784-789, Jul./Aug. 1998.

A.Piippo et al., "Adaptive Observer Combined With HF Signal Injection For Sensorless Control of PMSM Drives", in Proc. IEEE IEMDC'05, San Antonio, Texas, pp. 674-681, May 2005.

J.Niiranen, "Fast and Accurate Symmetric Euler Algorithm For Electromechanical Simulations", in Proc. Electrimacs'99, vol. 1, Lisboa, Portugal, pp. 71-78, Sep. 1999.

\* cited by examiner

METHOD AND SYSTEM IN CONNECTION WITH PERMANENT MAGNET SYNCHRONOUS MACHINES

BACKGROUND OF THE INVENTION

The invention relates to a method and system in connection with permanent magnet synchronous machines (PMSM). More specifically, the invention relates to a method of determining the angular speed and the rotor position of a speed and position sensorless PMSM drive equipped with an output filter and to an apparatus for carrying out the method.

Problems may be encountered in AC motor drives due to the non-sinusoidal voltage produced by a pulse-width modulated (PWM) inverter. The high rate of change of the voltage (i.e. high du/dt) may cause excessive voltage stresses in the stator winding insulations. It may also excite the parasitic capacitances of the stator winding and produce bearing currents. Lower-order harmonics cause acoustic noise and power losses; the losses caused by eddy currents are a special concern in high-speed solid-rotor motors.

A common approach to overcome these problems is to use an inverter output filter [1]-[4]. An LC filter, having the resonance frequency below the switching frequency, is a typical choice for the filter topology if a nearly sinusoidal output voltage is required. If a conventional scalar control method is used, the heavy filtering of the LC filter does not complicate the drive control. When better dynamic properties are demanded, a vector control method must be used. For vector control, the filter dynamics should be taken into account in the control design.

Various methods have been proposed for the vector control of variable-speed drives equipped with an LC filter [2]-[8]. Methods based on a feed-forward action and a sliding mode control are proposed for compensating for the effects of the filter in a speed-sensorless permanent magnet synchronous motor (PMSM) drive [2]. A full-order observer for a PMSM is implemented in the stator reference frame for estimating the rotor position in [3]. A feed-forward controller is used in a high-speed synchronous reluctance motor drive with an LC filter in [4]. In these methods, stator current or stator voltage measurements are needed. Vector control methods for induction motor drives with an LC filter are proposed in [5, 6] also require measurements from the motor side of the filter.

Due to the LC filter, the electrical quantities of the motor input differ from those of the inverter output. Frequency converters are equipped with measurements of the inverter output electrical quantities, but the motor terminal quantities are needed for vector control. In [2]-[6], the motor voltages or currents are measured by additional sensors, requiring hardware modifications in the motor drive. If the motor quantities are estimated instead, as proposed in [7, 8] for induction motor drives, the additional measurements are avoided and a filter can be added to an existing drive.

BRIEF DESCRIPTION OF THE INVENTION

It is an object of the present invention to provide a method that avoids the above-mentioned drawbacks and enables determining the rotor speed and position without additional measurements in a PMSM drive equipped with an LC filter. This object is achieved by a method and a system of the invention that are characterized by what is stated in independent claims 1 and 6.

The invention is based on the idea that the speed and position of the rotor can be accurately determined even at low speeds by using an adaptive full-order observer in combination with pulsating high-frequency signal injection [9]. The signal injection method can be surprisingly used in connection with an LC output filter, although the LC filter is situated on the current path between the inverter and the permanent magnet synchronous machine.

By using the method of the invention, the PMSM can be controlled without any speed or position sensors using vector control, thus eliminating the need of mechanical vulnerable instruments and additional wiring. Further, the method does not require any additional voltage or current measurements. Only the voltage of the intermediate circuit of the frequency converter and the output current of the inverter need to be measured. The method of the invention provides accurate information on the rotor position and speed and thus enables accurate control of PMSM drives equipped with an LC filter.

BRIEF DESCRIPTION OF THE FIGURES

The invention will now be described in more detail by means of preferred embodiments and with reference to the attached drawings, in which.

DETAILED DESCRIPTION OF THE INVENTION

In the following subsections, first a filter and machine model will be briefly discussed. Then an example of a control system suitable to be used in connection with the invention is described, after which the structure of the speed-adaptive full-order observer and the high-frequency signal injection used in the method of the invention is described.

Filter and Motor Models

Figure 1:
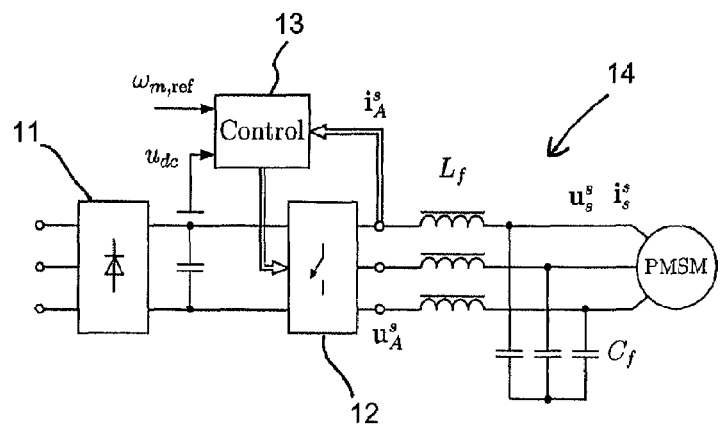
FIG. 1 shows a PMSM drive system equipped with a three-phase LC filter.

FIG. 1 shows a PMSM drive system equipped with an LC filter 14. The inverter output voltage $u_A$ is filtered by the LC filter consisting of filter inductances $L_f$ and filter capacitances $C_f$, resulting in a nearly sinusoidal stator voltage $u_s$. The inverter output current $i_A$ and the dc-link voltage $u_{dc}$ are the only measured quantities. The dc-link voltage is used in the control of the inverter itself. The dc-link voltage is formed by using a diode bridge 11 and inverter 12 is used to form alternating voltage from the dc-link voltage. The speed reference signal $\omega_{m,ref}$ is given as an input to the control 13 of the drive.

In the d-q reference frame fixed to the rotor, the model of the three-phase LC filter and PMSM can be written as $$\dot{x} = Ax + B[u_A \, \psi_{pm}]^T \qquad (1)$$

$$i_A = Cx \qquad (2)$$

where $x = [i_A \, u_s \, \psi_s]^T$ is the state vector consisting of the inverter output current $i_A = [i_{Ad} \, i_{Aq}]^T$, the stator voltage $u_s = [u_{sd} \, u_{sq}]^T$, and the stator flux linkage $\psi_s = [\psi_{sd} \, \psi_{sq}]^T$. The inverter output voltage $u_A = [u_{Ad} \, u_{Aq}]^T$ and the permanent magnet flux $\psi_{pm} = [\psi_{pm} \, 0]^T$ are considered as inputs to the system. The matrix transpose is denoted by superscript T. The system matrices in (1) and (2) are $$A = \begin{bmatrix} -R_{Lf}L_f^{-1}I - \omega_m J & -L_f^{-1}I & 0 \\ C_f^{-1}I & -\omega_m J & -C_f^{-1}L_s^{-1} \\ 0 & I & -R_s L_s^{-1} - \omega_m J \end{bmatrix} \quad (3)$$

$$B = \begin{bmatrix} L_f^{-1}I & 0 \\ 0 & C_f^{-1}L_s^{-1} \\ 0 & R_s L_s^{-1} \end{bmatrix} \quad (4)$$

$$C = \begin{bmatrix} I & 0 & 0 \end{bmatrix} \quad (5)$$

where $L_f$ is the inductance and $R_{Lf}$ is the series resistance of the filter inductor, $C_f$ is the filter capacitance, $R_S$ is the stator resistance, $\omega_m$ is the electrical angular speed of the rotor, and $$I = \begin{bmatrix} 1 & 0 \\ 0 & 1 \end{bmatrix}, \quad J = \begin{bmatrix} 0 & -1 \\ 1 & 0 \end{bmatrix}$$

The inductance matrix $$L_s = \begin{bmatrix} L_d & 0 \\ 0 & L_q \end{bmatrix}$$

consists of the direct-axis inductance $L_d$ and quadrature-axis inductance $L_q$.

Control System

Figure 2:
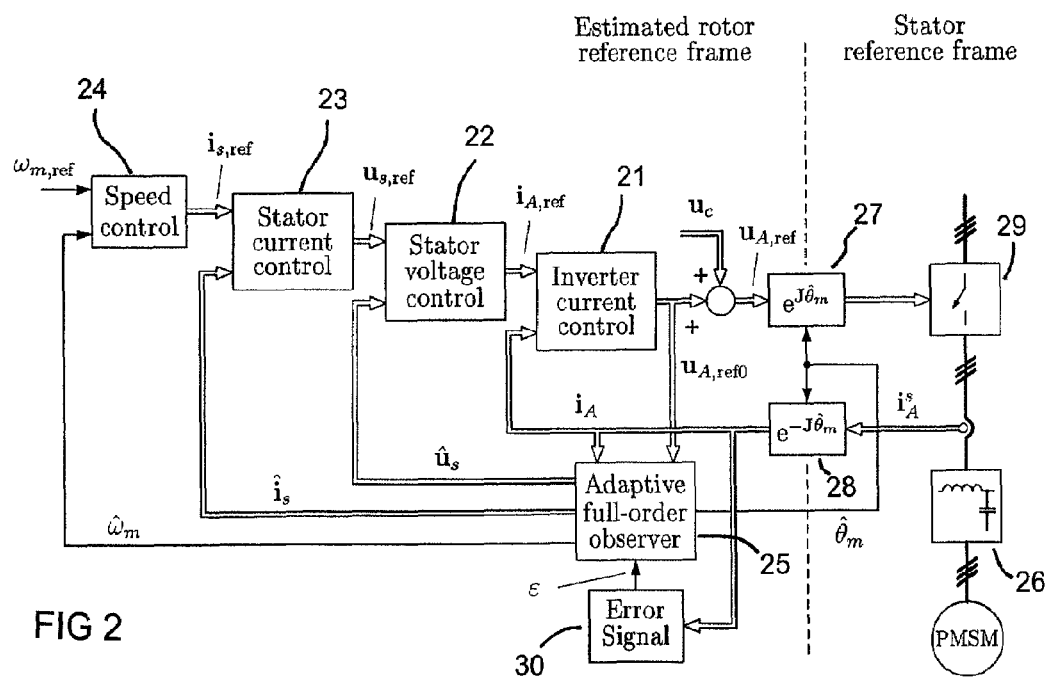
FIG. 2 shows a simplified block diagram of a control system used in connection with the PMSM drive.

FIG. 2 shows a simplified block diagram of the control system using the estimates obtained with the invention. In FIG. 2, the estimated quantities are marked by the symbol ^. The cascade control and speed-adaptive full-order observer 25 are implemented in the estimated rotor reference frame. The estimated rotor position $\hat{\theta}_m$ is obtained by integrating the estimated rotor angular speed $\hat{\omega}_m$. The inverter current $i_A$, the stator voltage $u_s$, and the stator current $i_s$ are controlled by PI controllers 21, 22, 23 respectively, and cross-couplings due to the rotating reference frame are compensated for. A maximum torque per current method is used for calculating the stator current reference $i_{s,ref}$. The rotor speed is governed by a PI controller 24 with active damping.

Space vectors on the left-hand side of coordinate transformations 27, 28 are in the estimated rotor reference frame and on the right-hand side in the stator reference frame. Double lines in FIG. 2 indicate vector quantities whereas single lines indicate scalar quantities. The coordinate transformations are carried out by rotating the vector values with an estimated rotor position angle $\hat{\theta}_m$. This estimated value is obtained from the observer system and its correctness is an important factor in the accuracy of the control. The control system of FIG. 2 will be further referred to in the following paragraphs. The dc-voltage measurement, as shown in FIG. 1 and needed for the inverter control, is not shown in FIG. 2.

Observer Structure

A speed-adaptive full-order observer has been successfully used in a sensorless induction motor drive equipped with an LC filter [7, 8]. A similar observer structure is constructed for the PMSM drive in the following. For stable operation at low speeds, the observer is augmented with an HF signal injection technique similarly as in [10].

HF Signal Injection

The HF signal injection method is based on [9]. A carrier excitation signal $$u_c = \hat{u}_c \cos(\omega_c t) \begin{bmatrix} 1 \\ 0 \end{bmatrix} \quad (6)$$

having amplitude $\hat{u}_c$ and angular frequency $\omega_c$ is superimposed on the inverter voltage reference $u_{A,ref0}$ in the estimated rotor reference frame as shown in FIG. 2. The inverter output current $i_A^s$ is measured, an HF current response is detected on the q-axis of the estimated rotor reference frame, and the amplitude is modulated by the rotor position estimation error. Thus the larger the error of the estimate of the rotor position is, the larger the amplitude of the current response is on the q-axis. If the error is zero and the estimate of the rotor position corresponds to the actual rotor position, the injected voltage does not produce any current to q-axis. The measured current is transformed to rotor reference frame with a transformation block 28, which multiplies the measured current by $e^{-J\hat{\theta}_m}$. The q-axis current signal is then bandpass filtered, demodulated, and low-pass filtered in an error signal generation block 30 to obtain error signal $$\epsilon \approx K_\epsilon \sin(2\tilde{\theta}_m) \quad (7)$$

where $K_\epsilon$ is the signal injection gain and $\tilde{\theta}_m$ is the estimated error of the rotor position. Without the inverter output LC filter, the signal injection gain would be $$K_\epsilon = \frac{\hat{u}_c}{\omega_c} \frac{L_q - L_d}{4 L_q L_d}. \quad (8)$$

The error signal (7) is used as a correction in the adaptive full-order observer described in the following subsection.

The LC filter affects the signal injection gain (8). To illustrate the effect, amplitude and phase responses from the inverter voltage to the inverter current were calculated by Control System Toolbox of the MATLAB® software.

Figure 3:
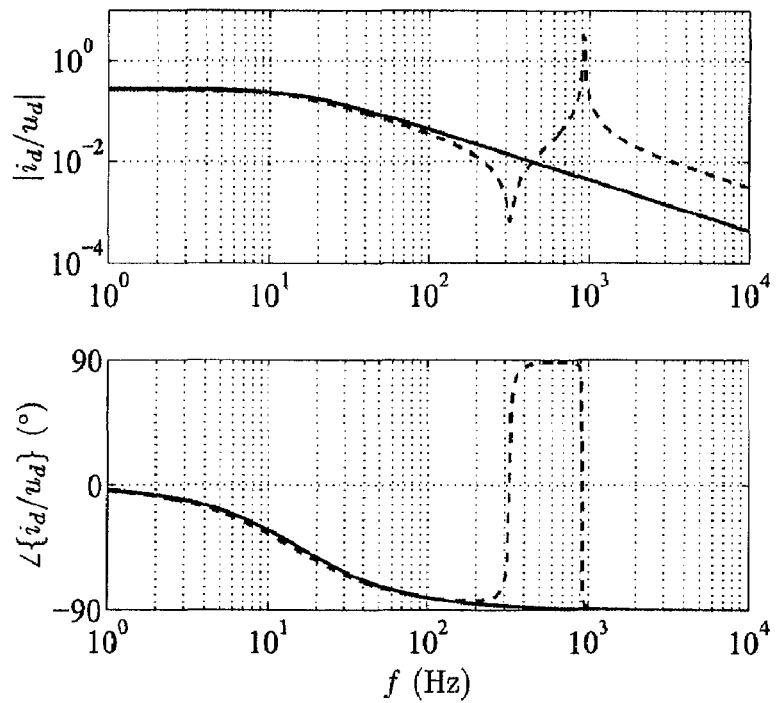
FIG. 3 shows amplitude and phase responses of the PMSM from d-axis voltage to d-axis current.

Parameters given in Table 1 were used for this example. The response from the d-axis voltage to the d-axis current is shown in FIG. 3 for the rotor position estimation error $\tilde{\theta}_m = 10°$. The amplitude response has a notch at the resonance point of the filter capacitor and the d-axis inductance of the PMSM, and a peak at the filter resonance point. Above f=500 Hz, the LC filter amplifies the response compared to the response obtained by the PMSM only.

Figure 4:
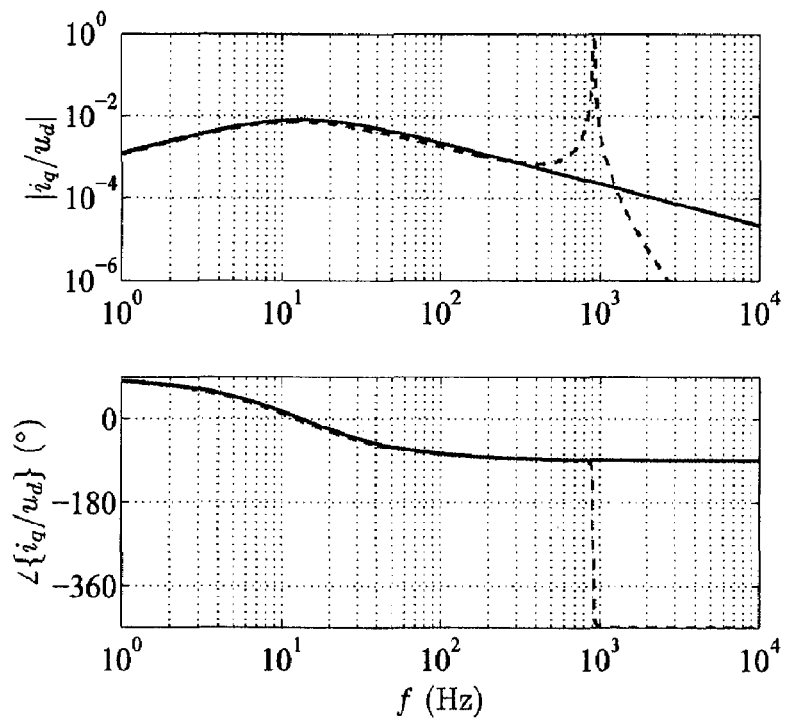
FIG. 4 shows amplitude and phase responses of the PMSM from d-axis voltage to q-axis current.

FIG. 4 shows the amplitude and phase response from the d-axis voltage to the q-axis current for the rotor position estimation error $\tilde{\theta}_m = 10°$. Compared to FIG. 3, the parallel resonance of the filter capacitance and the motor inductance is not visible. Instead, the peak exists in the amplitude response. After the peak, the amplitude response decays rapidly when the frequency increases. It is reasonable to select the frequency of the HF excitation voltage below the resonant frequency of the filter. If the margin between the signal injection frequency and the LC filter resonant frequency is small, the HF current amplitude, and hence also the signal injection gain, are increased by the LC filter.

Speed-Adaptive Full-Order Observer

The adaptive full order observer is based on the dynamic model of the system, the inverter current being the measured feedback signal for the observer. The electrical angular speed of the rotor is estimated using an adaptation mechanism. The observer is defined by $$\hat{\dot{x}} = \hat{A}\hat{x} + \hat{B}[u_A \hat{\psi}_{pm}]^T + K(i_A - \hat{i}_A) \quad (9)$$

where the system matrix and the observer gain matrix are $$\hat{A} = \begin{bmatrix} -\hat{R}_{Lf}\hat{L}_f^{-1}I & -\hat{L}_f^{-1}I & 0 \\ \hat{C}_f^{-1}I & 0 & -\hat{C}_f^{-1}\hat{L}_s^{-1} \\ 0 & I & -\hat{R}_s\hat{L}_s^{-1} \end{bmatrix} - (\hat{\omega}_m - \omega_\varepsilon) \begin{bmatrix} J & 0 & 0 \\ 0 & J & 0 \\ 0 & 0 & J \end{bmatrix} \quad (10)$$

$$\hat{B} = \begin{bmatrix} \hat{L}_f^{-1}I & 0 \\ 0 & \hat{C}_f^{-1}\hat{L}_s^{-1} \\ 0 & \hat{R}_s\hat{L}_s^{-1} \end{bmatrix} \quad (11)$$

$$K = \begin{bmatrix} k_{1d}I + k_{1q}J \\ k_{2d}I + k_{2q}J \\ k_{3d}I + k_{3q}J \end{bmatrix} \quad (12)$$

and ^ denotes estimated quantity. The factors $k_{id}$ and $k_{iq}$ (i=1, 2, 3) are scalar gain parameters, of which $k_{1d}$ has to be a large positive constant (several p.u.) to ensure stability. The observer defined in (9) produces estimates for the states of inverter output current vector $\hat{i}_A$, stator voltage vector $\hat{u}_s$ and stator flux linkage vector $\hat{\psi}_s$ these being the state variables in vector $\hat{x}$. As seen in FIG. 2, the observer system 25 outputs estimates for stator voltage vector $\hat{u}_s$, stator current vector is, electrical angular speed of the rotor $\hat{\omega}_m$ and rotor position $\hat{\theta}_m$. As described earlier, the estimates for rotor speed, stator current and stator voltage are used as feedback signals in the control of the system in the embodiment of FIG. 2.

The observer defined in (9) receives as inputs measured inverter output current $i_A$, inverter output voltage $u_A$ and estimated permanent magnet flux $\hat{\psi}_{pm}$. The inverter output voltage $u_A$ is usually determined directly as being the voltage reference that is used to control the inverter. Inverters are usually so fast in operation that the voltage reference given to them is implemented very accurately. In the embodiment of FIG. 2, the observer 25 receives inverter voltage reference $u_{A,ref\,0}$ as the input $u_A$. The permanent magnet flux $\hat{\psi}_{pm}$ of equation (9) is a constant value estimated before the start of the drive of during the commissioning of the drive for example.

The measured inverter output current $i_A$ is used directly in the observer defined in equation (9) as a feedback signal providing correction to the observer. The estimated inverter output current is subtracted from the measured one to provide current error. This error is multiplied by the matrix K as defined in (9).

As seen from FIG. 2, the estimated flux linkage vector $\hat{\psi}_s$ is not used in the control as such. However, the estimated flux linkage vector is used in the calculation of an estimate of stator current vector $\hat{i}_s$. This estimate is calculated from the flux estimates with equation is $\hat{i}_s = \hat{L}_s^{-1}(\hat{\psi}_s - \hat{\psi}_{pm})$. The control system could also be constructed in such a way that it would utilize estimated flux linkage directly. Also, it is possible to construct the observer system such that it would use stator current as a state variable.

The adaptation law used to correct the adaptive system to correspond with the real system is $$\hat{\dot{\omega}}_m = -K_p(i_{Aq} - \hat{i}_{Aq}) - K_i\int(i_{Aq} - \hat{i}_{Aq})dt \quad (13)$$

where $K_p$ and $K_i$ are nonnegative adaptation gains. Equation (13) thus produces an estimate for the electrical angular speed of the rotor based on the estimated and measured value of the inverter output current. Equation (13) is basically a PI controller having the error between the estimated and the measured inverter output current as the error that is to be minimized.

The speed correction term $\omega_\varepsilon$ is obtained by a PI mechanism $$\omega_\varepsilon = v_p \epsilon + v_i \int \epsilon \, dt \quad (14)$$

from the error signal $\epsilon$ obtained from signal injection structure, where $v_p$ and $v_i$ are nonnegative gains. The speed correction term $\omega_\varepsilon$ and the electrical angular speed $\hat{\omega}_m$ are used in the system matrix $\hat{A}$ to adapt the observer system with the controlled real system and to correct the angular speed estimate to correspond with the actual value. The feedback and corrections made to both equations (9) and (10) affect the observed values obtained from the observer. Since the angular speed is corrected by using signal injection technique and feedback is obtained from the measured current, the observed values and the speed and position information are accurate and the whole control of the drive is reliable even at low speeds despite the LC filter.

The change in the signal injection gain (8) caused by the LC filter should be taken into account when selecting gains for equation (14). These gains can be determined roughly from the responses of FIGS. 3 and 4, and more specifically by simulations or experiments.

The digital implementation of the adaptive full-order observer can be based on a simple symmetric Euler method [11], for example.

It is obvious to a person skilled in the art that the basic idea of the invention can be implemented in many different ways. The control system described above is only presented to give an example how the method and system according to the present invention can be taken into use. The structure of the speed adaptive observer can also be implemented in a plurality of ways. The invention and its embodiments are thus not restricted to the examples described above, but can vary within the scope of the claims.

TABLE 1

| Motor Parameters | |
|---|---|
| Stator resistance $R_s$ | 3.59 Ω |
| Direct-axis inductance $L_d$ | 36.0 mH |
| Quadrature-axis inductance $L_q$ | 51.0 mH |
| Permanent magnet flux $\psi_{pm}$ | 0.545 Vs |
| Nominal power | 2.2 kW |
| Nominal current $I_N$ | 4.3 A |
| Nominal frequency $f_N$ | 75 Hz |
| Number of pole pairs p | 3 |
| Filter Parameters | |
| Inductance $L_f$ | 5.1 mH |
| Capacitance $C_f$ | 6.8 μF |
| Series resistance $R_{Lf}$ | 0.1 Ω |

REFERENCES

[1] Y. Murai, T. Kubota, and Y. Kawase, "Leakage current reduction for a high-frequency carrier inverter feeding an induction motor," *IEEE Trans. Ind. Applicat.*, vol. 28, no. 4, pp. 858-863, July/August 1992

[2] M. Carpita, D. Colombo, A. Monti, and A. Fradilli, "Power converter filtering techniques design for very high speed drive systems," in *Proc. EPE'01*, Graz, Austria, August 2001

[3] T. D. Batzel and K. Y. Lee, "Electric propulsion with sensorless permanent magnet synchronous motor: implementation and performance," *IEEE Trans. Energy Conversion*, vol. 20, no. 3, pp. 575-583, September 2005

[4] J.-D. Park, C. Khalizadeh, and H. Hofmann, "Design and control of high-speed solid-rotor synchronous reluctance drive with three-phase LC filter," in *Conf. Rec. IEEE-IAS Annu. Meeting*, Hong Kong, China, October 2005, pp. 715-722

[5] R. Seliga and W. Koczara, "Multiloop feedback control strategy in sinewave voltage inverter for an adjustable speed cage induction motor drive system," in *Proc. EPE'01*, Graz, Austria, August 2001, CD-ROM

[6] M. Kojima, K. Hirabayashi, Y. Kawabata, E. C. Ejiogu, and T. Kawabata, "Novel vector control system using deadbeat-controlled PWM inverter with output LC filter," *IEEE Trans. Ind. Applicat.*, vol. 40, no. 1, pp. 162-169, January/February 2004

[7] J. Salomäki, M. Hinkkanen, and J. Luomi, "Sensorless vector control of an induction motor fed by a PWM inverter through an output LC filter," *Trans. IEEJ*, vol. 126-D, no. 4, pp. 430-437, April 2006

[8] - - - , "Sensorless control of induction motor drives with inverter output filter," in *Proc. IEEE IEMDC'05*, San Antonio, Tex., May 2005, pp. 332-339

[9] M. Corley and R. D. Lorenz, "Rotor position and velocity estimation for a salient-pole permanent magnet synchronous machine at standstill and high speeds," *IEEE Trans. Ind. Applicat.*, vol. 43, no 4, pp 784-789, July/August 1998

[10] A. Piippo and J. Luomi, "Adaptive observer combined with HF signal injection for sensorless control of PMSM drives," in *Proc. IEEE IEMDC'05*, San Antonio, Tex., May 2005, pp. 674-681.

[11] J. Niiranen, "Fast and accurate symmetric Euler algorithm for electromechanical simulations," in *Proc. Electrimacs'99*, vol. 1, Lisboa, Portugal, September 1999, pp. 71-78.

The invention claimed is:

1. A method in connection with a speed and position sensorless permanent magnet synchronous machine equipped with an output filter and driven by an inverter, wherein the method comprises the steps of forming a speed-adaptive full-order observer based on the dynamic model of the combination of the permanent magnet synchronous machine (PMSM) and the output filter, the observer using inverter output current ($i_A$) as the measured feedback signal and an estimate for the electrical angular speed ($\hat{\omega}_m$) of the motor and a speed correction term ($\omega_\epsilon$) for adaptation of the observer, measuring the inverter output current ($i_A$), estimating inverter output current ($\hat{i}_A$) using the observer, determining the estimate for the electrical angular speed ($\hat{\omega}_m$) of the machine using the estimated inverter output current ($\hat{i}_A$) and measured inverter output current ($i_A$) in an adaptation law, injecting a voltage signal ($u_c$) into the inverter voltage reference ($u_{A,ref0}$) to obtain a modified voltage reference ($u_{A,ref}$) that is used to control of the inverter, detecting an error signal ($\epsilon$) from the measured inverter output current ($i_A$) originating from the injected voltage signal ($u_c$), and calculating the speed correction term ($\omega_\epsilon$) used in the adaptation of the observer from the error signal ($\epsilon$).

2. A method according to claim 1, wherein the estimate for the electrical angular speed of the machine is determined using a PI controller algorithm where the error between the estimated inverter output current and the measured inverter output current is used as the error that is controlled to zero and the output of the controller provides the estimate for the angular speed of the machine.

3. A method according to claim 1, wherein the speed correction term is calculated using a PI controller algorithm where the error signal is used as the error controlled to zero and the output of the controller provides the speed correction term.

4. A method according to claim 1, wherein the speed adaptive observer has a correction term, which is based on the difference between the measured inverter output current and the estimated inverter output current, the estimated inverter output current being obtained from the observer.

5. A method according to claim 1, wherein the speed correction term and the estimated rotor angular speed are used in the system matrix of the speed-adaptive observer.

6. A system in connection with a speed and position sensorless permanent magnet synchronous machine equipped with an output filter and driven by an inverter, wherein the system comprises a speed-adaptive full-order observer based on the dynamic model of the combination of the permanent magnet synchronous machine (PMSM) and the output filter, the observer being adapted to use inverter output current ($i_A$) as the measured feedback signal and an estimate for the electrical angular speed ($\hat{\omega}_m$) of the motor and a speed correction term ($\omega_\epsilon$) for adaptation of the observer, means for measuring the inverter output current ($i_A$), the observer being adapted to estimate inverter output current ($\hat{i}_A$), adaptation means adapted to determine the estimate for the electrical angular speed ($\hat{\omega}_m$) of the machine using the estimated inverter output current ($\hat{i}_A$) and measured inverter output current ($i_A$), signal injection means adapted to inject a voltage signal ($u_c$) into the inverter voltage reference ($u_{A,ref0}$) to obtain a modified voltage reference ($u_{A,ref}$) that is used to control of the inverter, detection means adapted to detect an error signal ($\epsilon$) from the measured inverter output current ($i_A$) originating from the injected voltage signal ($u_c$), and calculation means adapted to calculate the speed correction ($\omega_\epsilon$) term used in the adaptation of the observer from the error signal ($\epsilon$).

7. A method according to claim 2, wherein the speed correction term is calculated using a PI controller algorithm where the error signal is used as the error controlled to zero and the output of the controller provides the speed correction term.

8. A method according to claim 2, wherein the speed adaptive observer has a correction term, which is based on the difference between the measured inverter output current and the estimated inverter output current, the estimated inverter output current being obtained from the observer.

9. A method according to claim 3, wherein the speed adaptive observer has a correction term, which is based on the difference between the measured inverter output current and the estimated inverter output current, the estimated inverter output current being obtained from the observer.

10. A method according to claim 2, wherein the speed correction term and the estimated rotor angular speed are used in the system matrix of the speed-adaptive observer.

11. A method according to claim 3, wherein the speed correction term and the estimated rotor angular speed are used in the system matrix of the speed-adaptive observer.

12. A method according to claim 4, wherein the speed correction term and the estimated rotor angular speed are used in the system matrix of the speed-adaptive observer.

* * * * *